United States Patent

[11] 3,593,761

| [72] | Inventor | Curtis L. Lorenz<br>3437 Scenic Drive, Modesto, Calif. 95350 |
|---|---|---|
| [21] | Appl. No. | 763,847 |
| [22] | Filed | Sept. 30, 1968 |
| [45] | Patented | July 20, 1971<br>Continuation-in-part of application Ser. No. 533,653, Mar. 11, 1966, now abandoned. |

[54] APPARATUS FOR PLACING FLUENT MATERIAL IN CARRIER DEVICES
12 Claims, 13 Drawing Figs.

[52] U.S. Cl. .................................................. 141/155,
141/163, 141/167, 141/190
[51] Int. Cl. ..................................................... B65b 43/60
[50] Field of Search .......................................... 119/56;
128/218 A, DIG. 1; 141/129, 144, 155, 163, 164,
167, 172, 173, 168, 187, 190, 191; 221/200, 201,
266, 277; 222/390

[56] References Cited
UNITED STATES PATENTS

| 418,621 | 12/1889 | Laning .................... | 141/164 |
| 1,416,156 | 5/1922 | Anderson et al. ........... | 141/164 X |
| 2,049,722 | 8/1936 | Phillips et al. ............ | 141/191 X |
| 2,378,114 | 6/1945 | Van Donk .... 74/Lost.Mat. Dig. (UX) |
| 2,715,991 | 8/1955 | Frank et al. ............... | 222/390 X |

Primary Examiner—Laverne D. Geiger
Assistant Examiner—Edward J. Earls
Attorney—Paul A. Weilein ABSTRACT: Containers or carrier devices in the form of straws which rest in longitudinal peripheral recesses of a rotary feeder are moved successively to an injection station to be filled by intermittent operation of a hypodermic syringe. Eccentric driving means actuates the rotary feeder by steps and operates the syringe in timed sequence with the steps. Means is provided for stopping the mechanism when it accumulates a supply of the filled straws.

INVENTOR.
CURTIS L. LORENZ
BY
Paul A. Weilein
ATTORNEY

INVENTOR.
CURTIS L. LORENZ
BY
Paul A. Weilein
ATTORNEY

INVENTOR.
CURTIS L. LORENZ
BY
Paul A. Weilein
ATTORNEY

APPARATUS FOR PLACING FLUENT MATERIAL IN CARRIER DEVICES

This application is a continuation-in-part of application Ser. No. 533,653, filed Mar. 11, 1966 and entitled Apparatus for Placing Fluent Material in Carrier Devices, now abandoned.

In the breeding of turkeys, the practice of artificial insemination has developed as a means for volume insemination of turkey hens for the resultant production of eggs.

The present invention involves the use of disposable carrier devices in the form of straws for seminal fluid, which carrier devices will be hereinafter characterized as straws, and more particularly an object of the invention is the provision of apparatus whereby successive straws may be loaded with a measured quantity of the seminal fluid and thereafter the straw may be employed for inseminating the turkey hen, the straw being preferably inexpensive and disposable.

Another object of the invention is to provide apparatus which repeatedly and accurately loads inseminating straws with measured amounts of seminal fluid, which measured amounts may be varied as to volume as may be desired or necessary from time to time.

In accordance with the foregoing, the present invention provides a portable filling apparatus adapted to be embodied in a carrying case having within the case all of the necessary instrumentalities for successively feeding straws to an injection station at which successive straws are loaded with a volume of seminal fluid, the successive feeding of straws to the injection station and the injection of fluid into the straws at such station being in timed relation.

Other objects and advantages of the invention will be hereinafter described or will become apparent to those skilled in the art, and the novel features of the invention will be defined in the appended claims.

In the accompanying drawings.

Like reference characters in the several views of the drawings and in the following description designate corresponding parts.

Figure 1:
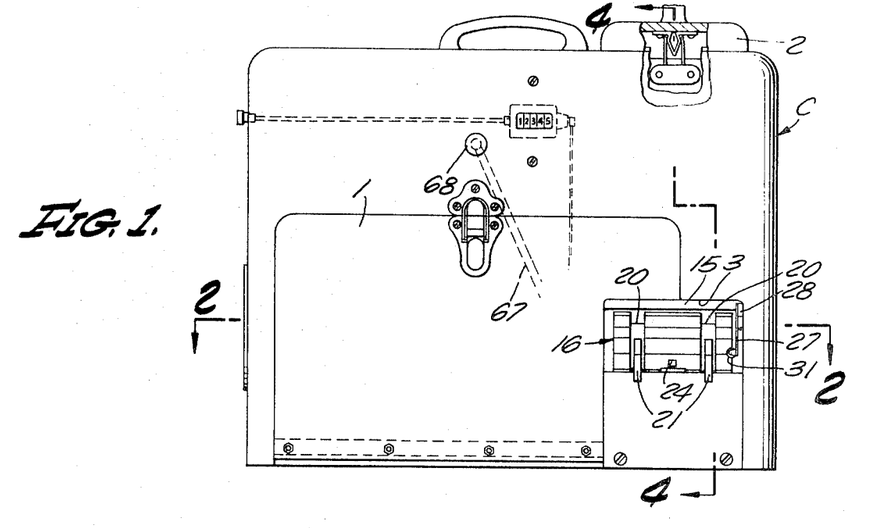
FIG. 1 is a view in front elevation of apparatus for placing fluent material in carrier devices, embodied in a carrying case, and made in accordance with the invention.

Referring first to FIG. 1, the invention will be seen to be incorporated in a carrying case generally denoted at C with a frontal closure 1 and also having on its top a small closure 2, these closures preferably being of dust excluding construction. Adjacent the right hand side of the case C is an opening 3 which, as will appear hereinafter, provides an access opening whereby a workman may obtain successive filled straws from the case.

Figure 2:
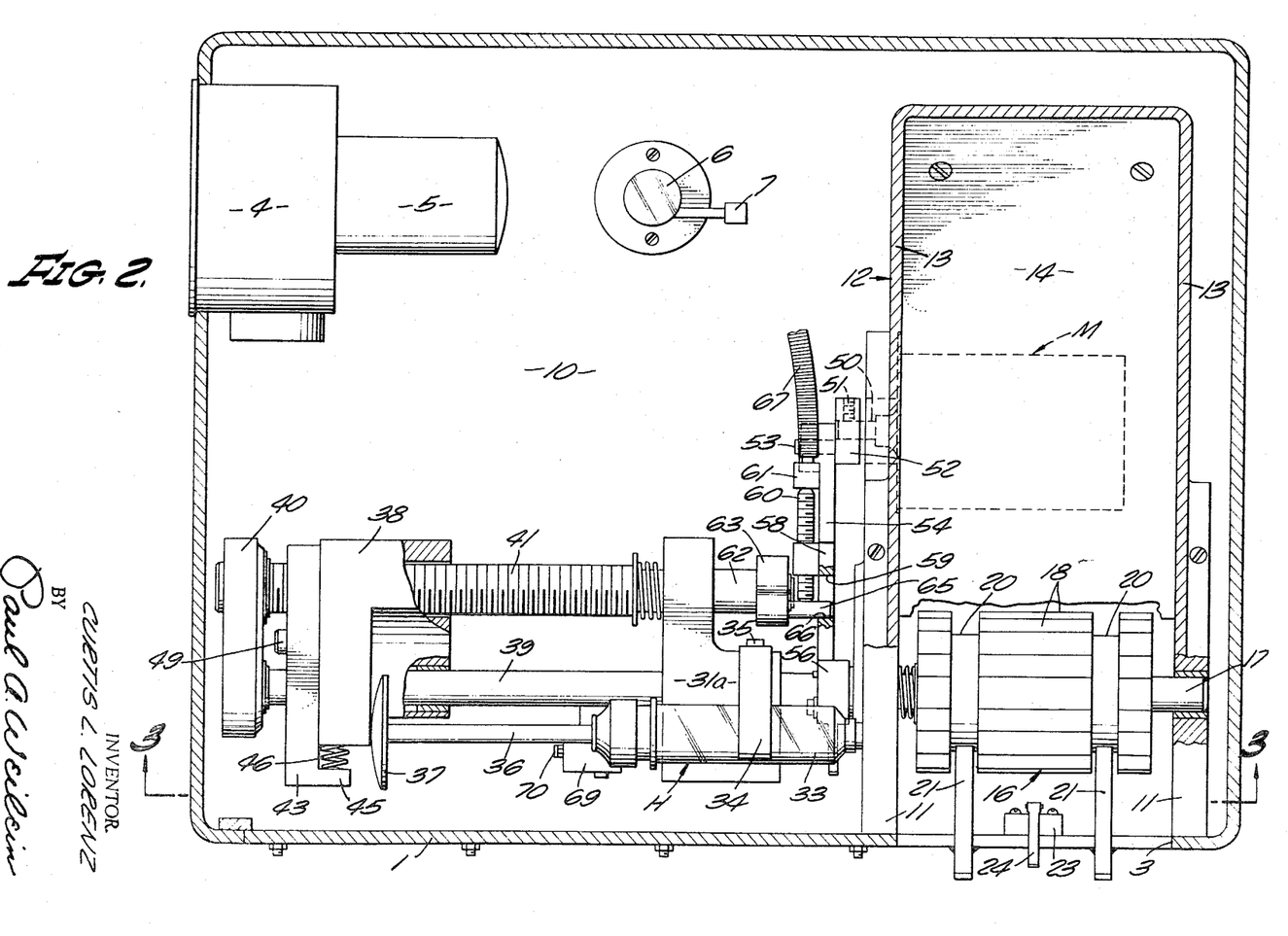
FIG. 2 is a horizontal sectional view on an enlarged scale as taken on the plane of the line 2–2 of FIG. 1.

Inasmuch as the artificial insemination of turkeys is generally conducted in an atmosphere which may tend to be dusty or dirty, it is preferred, as shown in FIG. 2, that a blower 4 be provided within the case C driven by a motor 5 whereby air will be continuously circulated downwardly through the interior of the case and out of the opening 3 referred to above, it being understood in this connection that the blower 4 would be equipped with a suitable filter so that clean air may be continuously passed over the apparatus within the case C. In addition, inasmuch as the insemination of turkeys may occur in cool regions, it is preferred that the temperature within the case C be maintained at a warm level and reasonably constant to preserve the seminal fluid against deterioration due to cold. Therefore, as also shown in FIG. 2, the case C may desirably be provided with a simple lamp 6 constituting a means for warming the interior of the case, and the lamp may be under the control of a thermostat 7 so that the heating effect of the lamp may be controlled.

Figure 3:
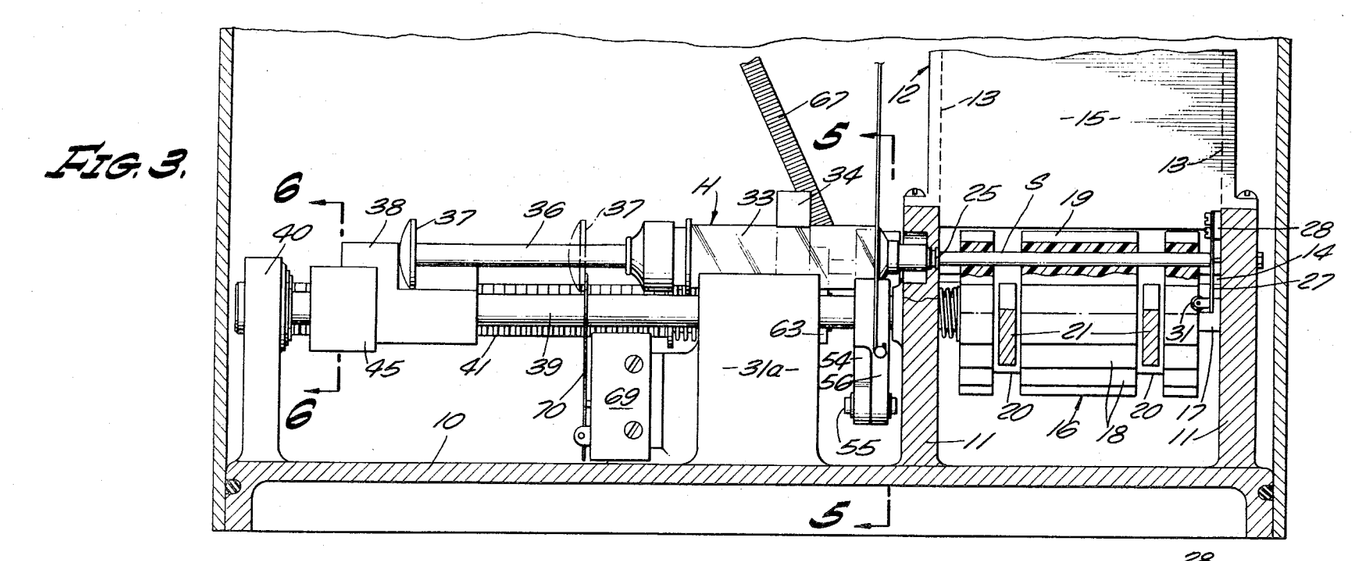
FIG. 3 is a vertical sectional view as taken on the line 3–3 of FIG. 2.
Figure 4:
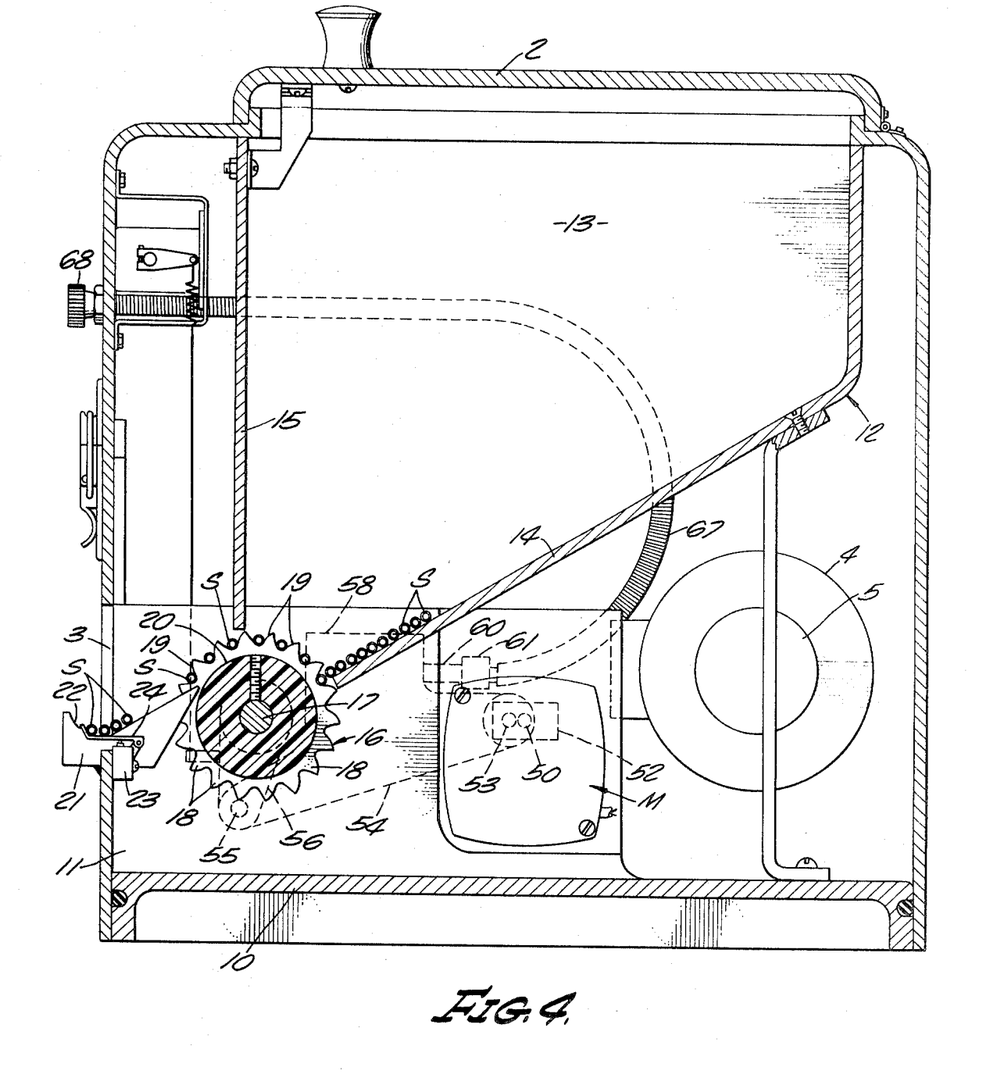
FIG. 4 is an enlarged view in vertical section as taken on the line 4–4 of FIG. 1.

Within the case C, as will be best seen upon reference to FIGS. 3 and 4, is a base or bottom 10 which constitutes a bottom closure for the case C and which also constitutes the base of various supports to be hereinafter described.

At the right-hand end of the case 10, as seen in FIG. 3, are a pair of upstanding brackets or supports 11 disposed in spaced relation and supporting thereabove a hopper generally denoted at 12 having sidewalls 13 and a downwardly inclined base or bottom wall 14 converging relative to a front wall 15 and terminating in spaced relation to the latter at the bottom of the hopper. The top closure 2 covers the fill opening of the hopper.

Mounted between the supports 11 so as to be disposed within the space between the hopper walls 14 and 15, is a rotary feeder 16 suitably mounted upon a shaft 17 which is journaled in the supports 11. On the feeder 16 is a suitable number of circumferentially arranged lugs 18 defining therebetween longitudinally extended straw receiving peripheral recesses or cavities, each of the lugs 18 having a leading face 19 which is so arched away from the direction of rotation of the feeder as to effectively displace excess straws as the leading faces pass under the adjacent lower edge of hopper wall 15. The straws, as best seen in FIG. 4, are adapted to gravitate along the inclined wall 14 toward the feeder 16 and into the cavities defined between the ribs 18 so as to be progressively and successively individually carried circumferentially within the feeder 16 as the latter is caused to rotate.

At spaced locations the feeder 16 is provided with circumferential grooves 20 into which project a pair of longitudinally spaced apart receiver fingers 21 which, as seen in FIG. 4, will engage successive straws S to displace them from the feeder 16. These fingers 21 are inclined downwardly so that the straws will gravitate to cradle sections 22 of the fingers 21. From the cradle sections 22 of the fingers, the straws may be manually lifted by a workman for the purpose of accomplishing the insemination of the turkeys.

In the event that the rate of straw filling of the machine exceeds the rate of straw utilization, means are provided for shutting off the operation of the machine, and such means is illustrated as comprising a switch 23 which, as shown in FIGS. 2 and 4, is disposed between the fingers 21 and has an operating arm 24 which would be engaged and depressed by a given number of straws resting in the cradle sections 22 of fingers 21, whereby to open the switch. Such opening of the switch will have the effect of shutting off the machine which is driven by an electric motor, all as will be hereinafter more fully described.

Figure 7:
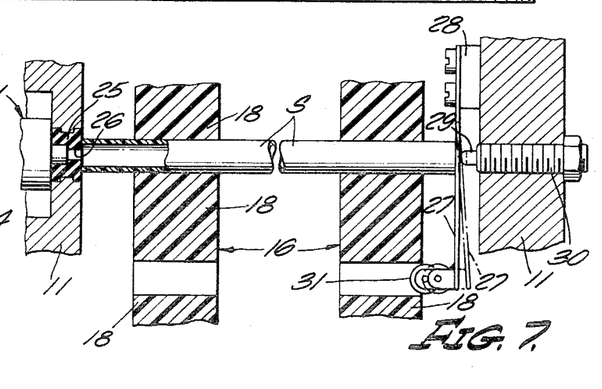
FIG. 7 is an enlarged detail view in horizontal section more particularly illustrating the positioning of a straw at the injection station.

In accordance with the objectives of the invention, means are provided for injecting into the successive straws a measured quantity of the seminal fluid of the male turkey. Accordingly, the straws S are adapted to be successively fed to what may be characterized as an injection station which, as best seen in FIGS. 3 and 7, is a station at which each straw is positioned in engagement with a sealing grommet 25 having a central opening 26, the grommet being mounted in the left hand base support 11. At this location the straw S is biased into sealing engagement with the grommet 25 by means of a flexible arm 27 supported as at 28 on the right-hand base support 11. The flexible arm 27 is engaged by a spring loaded plunger 29 mounted in a threaded body 30 which is in turn supported in the right-hand base support 11. At the free extremity of the flexible member 27 is a roller 31 adapted to be brought into engagement between adjacent lugs 18 at the end of the cavity therebetween to fix the position of the feeder 16. As the feeder 16 revolves to the next position, as will hereinafter appear, the roller 31 will be cammed from the cavity between the lugs 18 so as to depress the spring loaded plunger 29 and thereby relieve the sealing pressure applied to the straws S so that the same may be easily moved on past the injection station.

At the injection station means are provided for supporting an injector device. Such means in the illustrative embodiment includes a supporting member 31a upstanding from the base 10 and formed as at 32 to provide a cradle in which is disposed the cylindrical body 33 of a typical hypodermic syringe generally denoted at H. Means for retaining the syringe in the cradle are provided in the form of a leaf spring 34 overlying the support 31a in spaced relation thereto and mounted as at 35 to the back of the support so as to yieldably bear upon the body 33. The syringe has an actuating stem 36 provided with a head 37 engaged by a block 38 which is adapted to be progressively moved to the right as viewed in FIG. 3 to correspondingly move the stem 36 into the syringe body and force from the latter a quantity of the seminal fluid contained in the syringe, through the opening 26 in the grommet 25 and into a straw S while such straw is located at the injection station.

Figure 6:
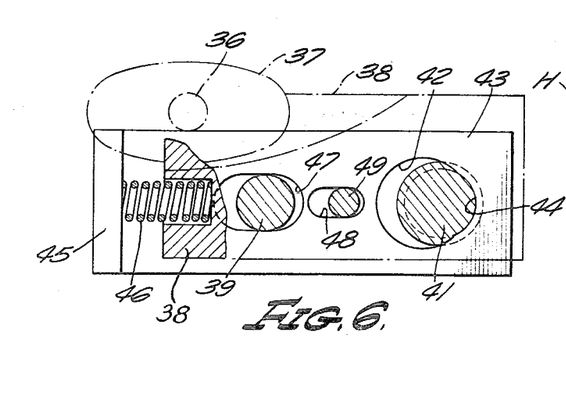
FIG. 6 is an enlarged detail view in section as taken on the line 6–6 of FIG. 3.

The block 38 is supported for movement on a support rod 39 extending between the support 31a and an upstanding support 40, the latter also being formed on or made a part of the base 10. Travel of the block 38 to the right is caused by the revolution of a feed screw 41 which also extends between the supports 31a and 40. As best seen in FIG. 6, the feed screw 41 is engaged in an enlarged opening 42 in a half nut member 43 having threads 44 at one side of the opening 42. The half nut member 43 extends along the block 38 and has an actuating projection 45 engaged by a coil spring 46 which biases the half nut member threads 44 into engagement with the threads of the feed screw 41. The member 43 also has an elongated opening 47 through which the support rod 39 extends and another elongated opening 48 through which a retaining fastener 49 extends, whereby the half nut member 43 is mounted upon the block 38.

It will now be understood that the half nut member 43 may be moved to the right as viewed in FIG. 6 so as to disengage the thread 44 from the feed screw 41 so that the block 38 may be manually released for movement to the left as viewed in FIG. 3 to accommodate a new syringe following depletion of the supply of fluid in the previous syringe.

Means are provided for alternately effecting the intermittent rotation of the feeder 16 and the feed screw 41 whereby successive straws will be moved from the hopper to the injection station and while at such station the feed screw 41 will be revolved sufficiently to cause axial movement of the block 38 a sufficient distance to inject from the syringe H a measured quantity of the seminal fluid into the straw S then at the injection station.

Figure 5:
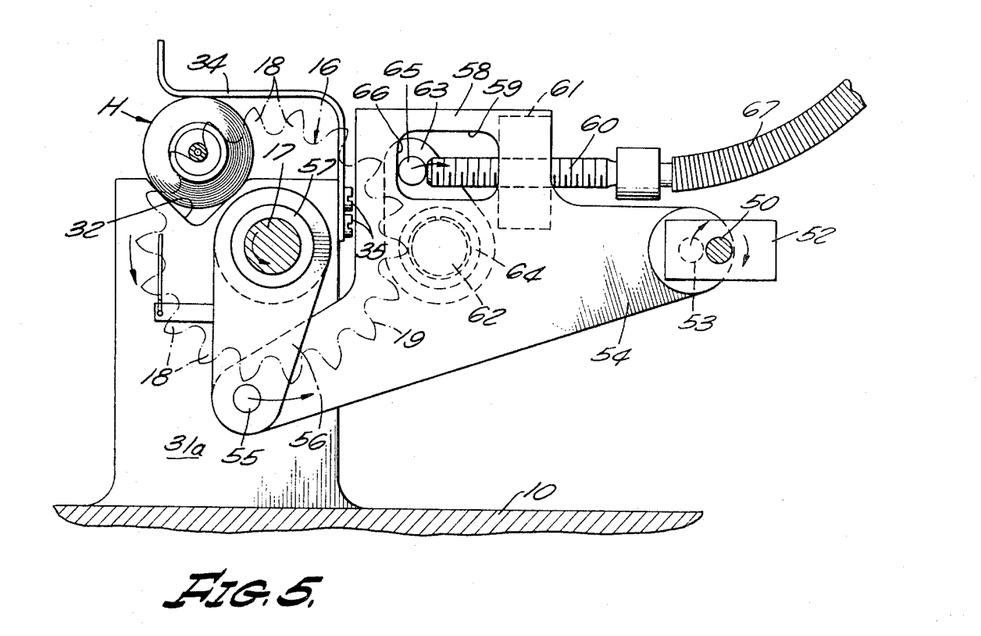
FIG. 5 is a transverse sectional view as taken on the line 5–5 of FIG. 3.

The means for alternately effecting the operation of the feeder 16 and the screw 41 are best seen in FIGS. 2 and 5. Suitably mounted upon the base 10 within the case C is a drive motor M which drives a power shaft 50. Mounted on the shaft 50 as by a set screw 51 is a crank member 52 which carries a crank pin 53. This pin 53 is connected to a link or pitman 54 at one end of the latter. At its other end the link 54 is connected by a pin 55 to a lever arm 56. The lever arm 56 is disposed about a portion of feeder shaft 17 which extends through the left hand support 11 and interposed between the shaft 17 and the lever arm 56 is a one-way clutch 57 which is adapted to cause counterclockwise rotation of shaft 17 as viewed in FIG. 5 but which will release upon movement of the lever arm 56 in the other direction. With such a construction it will be understood that each revolution of the motor shaft 50 will impart to the shaft 17 an increment of rotation during movement of the link 54 in one direction, but the shaft 17 will remain stationary during movement of the link 54 in the other direction. The throw of the crank member is selected relative to the feeder 16 so that each revolution of power shaft 50 will cause movement of the feeder 16 a distance equal to the space between adjacent cavities in the feeder so that each such movement of the feeder will bring to the injection station a successive straw S.

The link 54 in addition is adapted to operate screw 41 and in this connection has an upwardly projecting portion 58 having an elongated opening 59 therein. Projecting alongside the elongated opening 59 is a screw 60 threadedly engaged in a block 61 carried by the link 54. In order to transmit the motion of the link 54 to the screw 41 so that the latter will cause movement of the block 38 in a direction to inject fluid from the syringe into the straw S at the injection station, the screw cause is provided at its inner end with an extension 62 about which is disposed a lever arm 63. The lever arm 63 is connected to the shaft extension 62 by a one-way clutch 64. At the free end of the lever arm 63 is a pin 65 which is a projection carried by the feed screw and which extends into the elongated opening 59 between an end wall 66 of the latter and the end of the crew 60. Accordingly, when the link 54 moves to the right as viewed in FIG. 5, this being the direction which will cause rotation of the shaft 17, the end wall 66 will engage the pin 65 of the lever 63 and the clutch 64 will be disengaged so as to allow the lever 63 to pivot to the right as viewed in FIG. 5. However, when the link 54 moves to the left, the direction in which the clutch 57 is disengaged so that the shaft 17 remains idle, the screw 60 will engage the pin 65 on the lever 63 to cause an increment of angular motion of the lever 63 to be imparted to the screw 41, thus feeding the block 38 to the right as viewed in FIG. 2 a distance which will be a function of the lead angle of the screw. It is apparent that the end wall 66 of the opening 59 and the end of the screw 60 constitute two spaced confronting shoulders which operate with lost motion to actuate the feed screw 41 for incremental advance of the plunger 36 of the dispensing syringe 33, the lost motion being adjustable by the screw 60 to adjust the increment of advance of the syringe plunger. Preferably, the screw 60 may be adjusted from the exterior of the case C and, therefore, there is shown a Bowden wire 67 connected to the screw 60 and leading to an operating handle 68 (see FIGS. 1 and 4).

Means are provided for shutting off the machine following a given number of increments of movement of the block 38 so that while the machine is shut off a full syringe may be substituted for a depleted syringe. ACcordingly, such means may comprise a stop switch 69 suitably mounted as for example on the support 31a and having a switch arm 70 disposed in the path of the head 37 of the syringe stem 36 so that the switch will be opened when the syringe is depleted.

The operation of the device described above will now be understood to be as follows. A suitable number of straws S will be placed in the hopper so as to gravitate into positions to be progressively and successively engaged between feeder ribs 18 in the cavities defined therebetween and a full syringe of seminal fluid will be placed in the cradle of support 31a with the actuator head 37 of the syringe engaged by the block 38. The half nut member 43, under the influence of spring 46, will be threadedly engaged with screw 41 and the apparatus is in condition for operation. WHen the motor M is engaged each revolution of the power shaft 50 will cause reciprocation of the link 54 through 1 cycle. Each cycle of the link 54 will cause 1 increment of rotation of the feeder shaft 17 so as to bring one straw to the injection station, as shown in FIG. 7, and the spring plunger 29 acting through the flexible arm 27 will load the straw into engagement with the sealing grommet. Opposite movement of the link 54 will effect an increment of rotation of the screw shaft 41 through the lever arm 63 so as to cause an increment of movement of the block 38 into the syringe body so that there will be displaced from the latter a representative quantity of the seminal fluid which will be injected into the straw S.

It is apparent that a first means advances the rotary feeder 16 one step in response to a first half of a revolution of the drive shaft 50 that carries the crank 52 and that a second means including the adjustably based shoulders formed by the end wall 66 and the screw 60 operates with lost motion to advance the syringe plunger 36 by an increment in response to the second half of the rotation of the drive shaft.

Each cycle of the link 54 will repeat the above described operations so that loaded straws will be successively displaced from the feeder 16 by fingers 21, and such straws will gravitate to the cradle portions 22 of the fingers.

So long as the workmen who are inseminating the turkeys use the straws S from the cradle sections at a rate equal to the rate of operation of the machine, the operation will continue. However, should the loaded straws commence to build up in the cradles to such an extent that it is desirable that the machine be shut off temporarily, the switch 23 will shut the machine off until such time as the excess of loaded straws has been depleted. It will be understood in this latter connection that, if desired, a manual switch may be employed if preferred.

When the syringe is depleted of seminal fluid, the switch 69 will cause operation of the machine to be ceased and the half nut member 43 may then be disengaged from the screw 41 and shifted to a starting position following which the depleted syringe may be removed and a new syringe substituted. The operation may then be resumed.

Inasmuch as the straws are disposable and are all filled in a comparatively sanitary environment, that is, in a dust free environment, due to the existence of the fan and filter described above, and under preferred temperature conditions due to the heating lamp and thermostat described above, the insemination of turkeys has been rendered by the present invention comparatively safe insofar as contamination of the turkey hens is concerned. In addition, the present invention provides for consistent loading of straws with the desired volume of fluid so that each turkey hen will receive the same quantity of seminal fluid, resulting in efficient fertilization as well as conservation of the seminal fluid.

FIGS. 8—13 indicate the construction of an alternate and now preferred embodiment of the mechanism for intermittently rotating the rotary feeder 16 by one step and intermittently rotating the feed screw 41 by one step to carry out the previously described operating cycle. The structure of the alternate embodiment of the actuating mechanism is similar in several respects to the first described actuating mechanism as indicated by the use of corresponding numerals to indicate corresponding parts.

Figure 8:
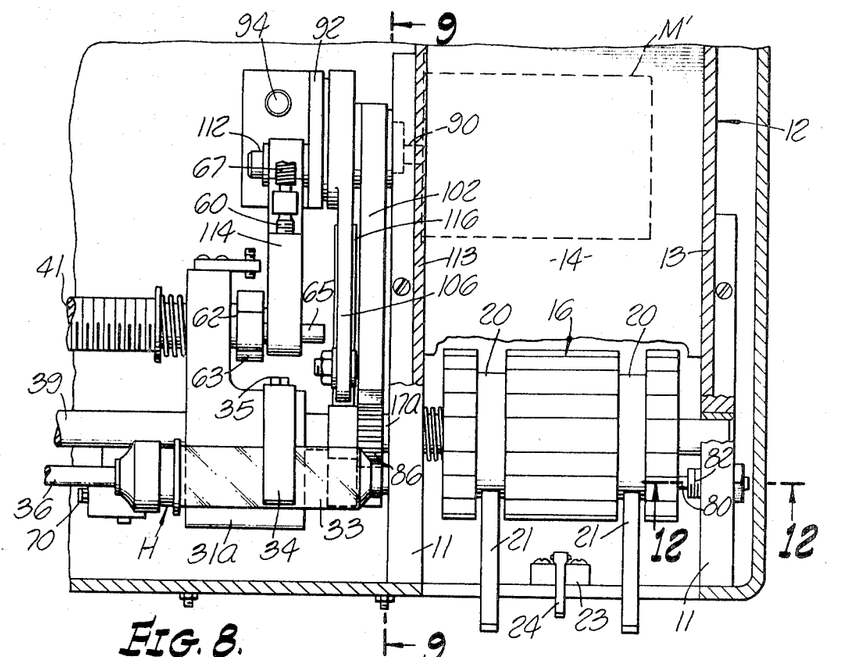
FIG. 8 is a fragmentary elevational view illustrating an alternate and presently preferred mechanism for actuating the rotary feeder 16 and the feed screw 41.

In FIG. 8 a previously described hopper 12 having sidewalls 13 and a front wall 14 supplies successive empty straws to a previously described rotary feeder 16 which is mounted on a shaft 17a that is journaled in two spaced supports 11. The feeder 16 is of the previously described construction and has the previously described circumferential grooves 20 and the corresponding cooperative receiver fingers 21. The successive straws are carried by longitudinal peripheral recesses of the feeder 16 that are defined by longitudinal lugs or radial ribs 18, the recesses being best shown in FIG. 13.

Figure 9:
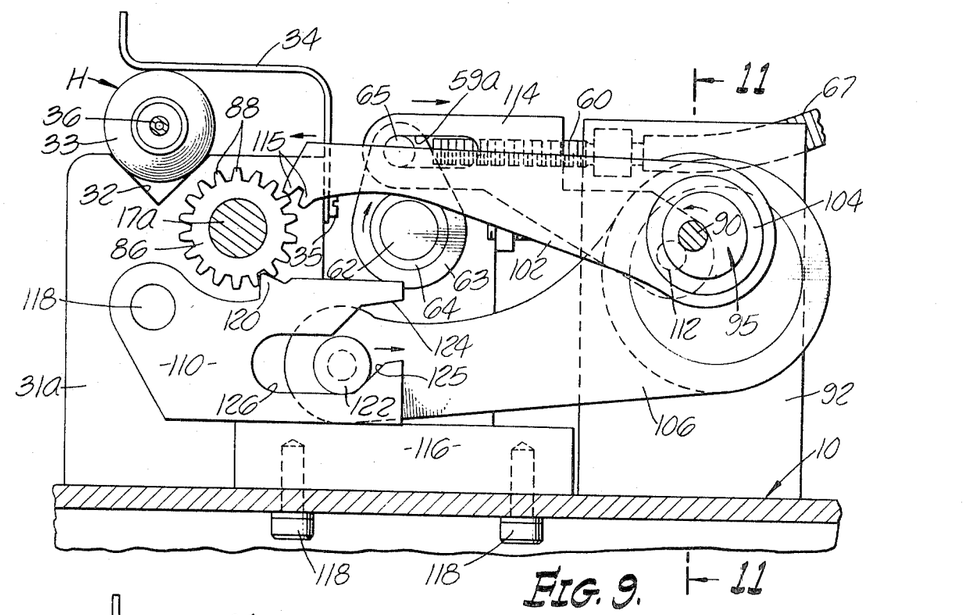
FIG. 9 is an elevational view of the second embodiment of the actuating mechanism as seen along the line 9–9 of FIG. 8 showing the moving parts as positioned at one point in the operating cycle.
Figure 10:
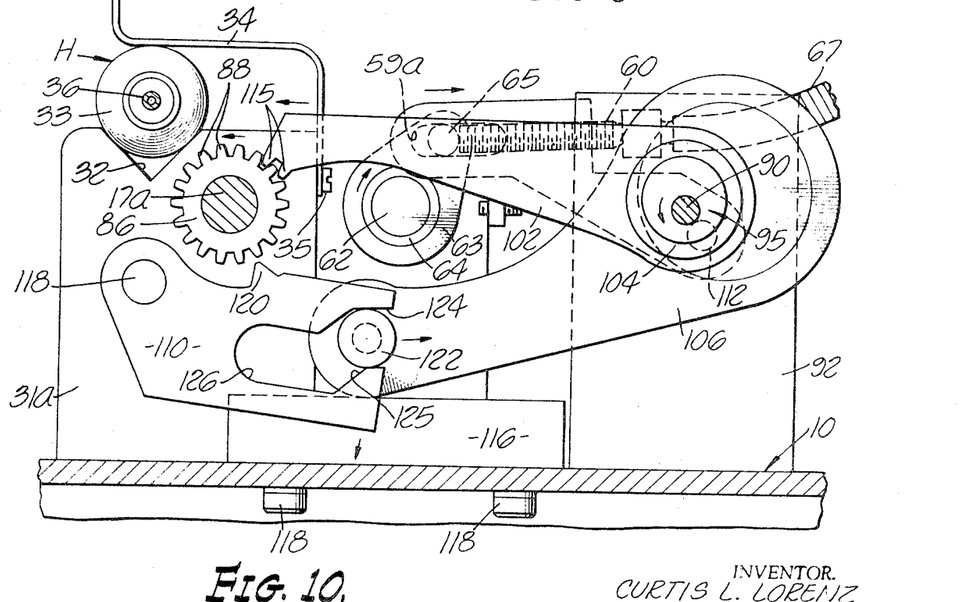
FIG. 10 is a similar view showing the parts as positioned at another point in the operating cycle.
Figures 12, 13:
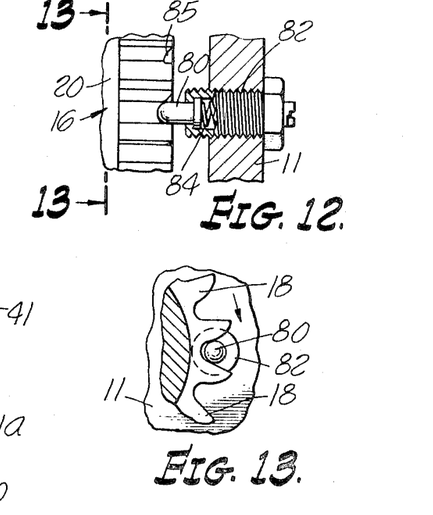
FIG. 12 is an enlarged fragmentary section taken along the line 12–12 of FIG. 8 showing the means for pressing the successive straws into sealing engagement with a grommet at the injection station.
FIG. 13 is a fragmentary section taken as indicated along the line 13–13 of FIG. 12.

To press the straws longitudinally into pressure engagement with the previously mentioned sealing grommet 25 that is shown in FIG. 7, a spring pressed plunger 80 best shown in FIG. 12 is mounted in a screw 82 in a support 11 and is urged towards the rotary feeder 16 by means of a confined compression spring 84. The plunger 80 has a rounded nose for pressure contact with the ends of the straws at the injection station and the rotary rounded feeder 16 is formed with suitable cam surfaces 85 to retract the plunger in response to rotation of the rotary feeder, the plunger thus stepping from one peripheral recess of the rotary feeder to another on each step of rotation of the rotary feeder. As shown in FIGS. 8, 9, and 10, the shaft 17a of the rotary feeder 16 carries a gear 86 having gear teeth 88 which are successively engaged for intermittent rotation of the rotary feeder.

A previously mentioned support 31a provides a seat 32 for a hypodermic syringe that is generally designated H. The hypodermic syringe has the usual actuating stem 36 which, as previously described but not shown in FIGS. 8—13, is engaged by a block 38 (FIGS. 3 and 6) which is slidingly mounted on the previously mentioned support rod 39, the block being integral with the previously described half nut member 43 for advance of the block in response to intermittent rotation of the feed screw 41.

Figure 11:
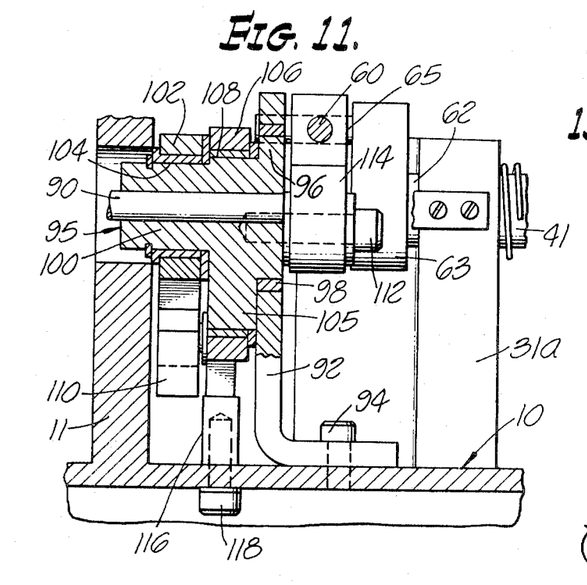
FIG. 11 is a section taken along the line 11–11 of FIG. 9.

As shown in FIGS. 8 and 11, the motor M' for actuating the mechanism has a shaft 90 with the outer end of the shaft stabilized by an L-shaped support bracket 92 that is anchored to the base 10 by suitable screws 94. As shown in FIG. 11, the outer end of the motor shaft 90 fixedly carries a metal block 95 which has a concentric end portion 96 that is journaled by a sleeve bearing 98 in the support bracket 92.

The metal block 95 is formed with a first eccentric portion 100 to reciprocate a pusher pawl 102 that is mounted on the eccentric portion by a suitable bearing sleeve 104. In like manner the metal block 95 is formed with a second eccentric portion 105 to reciprocate a locking pawl 106 which is operatively connected to the second eccentric portion by a bearing sleeve 108. The purpose of the locking pawl 106 is to actuate a locking member 110 to periodically lock the rotary feeder 16 against rotation.

The metal body 95 is further provided with an eccentric crank pin 112 which is journaled in a link 114 that periodically actuates the feed screw 41 in the same general manner as the previously described link 54. Thus, the link 114 has a previously described elongated opening or slot 59a (FIG. 9) with a screw 60 threaded into the link and extending into the elongated opening or slot, the screw being adjustable by remote control by means of a previously mentioned Bowden wire 67. The adjustable screw 60 and an end wall of the elongated opening 59a serve as spaced stop shoulders for engagement with a crank pin 65 with lost motion, the crank pin being carried by the previously mentioned lever arm 63. As previously described, the lever arm 63 is connected to an axial extension 62 of the feed screw 41 by means of a one-way clutch 64, the reciprocation of the link 114 intermittently rotating the feed screw 41.

The outer end of the reciprocating pusher pawl 102 is formed with a pair of teeth 115 to straddle and thus engage successive teeth 88 of the gear 86 for step rotation of the rotary feeder 16, each reciprocation of the pusher pawl bringing a new empty straw to the injection station.

As shown in FIGS. 9 and 10, the free end of the locking pawl 106 rides on the horizontal upper surface of a guide block 116 that is mounted on the base 10 by suitable screws 118. The locking member 110 which is positioned adjacent a side face of the guide block 116 is mounted by a pivot 118 on the support 31a to swing between a locking position shown in FIG. 9 and a retracted release position shown in FIG. 10. A locking tooth 120 of the locking member engages the gear 86 at the locking position of the locking member as shown in FIG. 9.

The free end of the locking pawl 106 carries a follower in the form of a roller 122 that engages a cam slot in the locking member 110. The cam slot has a short initial dwell 124 and an inclined cam portion 125 followed by a relatively long second dwell 126. In the cycle of operation of the locking member 110 the locking member is briefly retracted out of engagement with the gear 86 because the follower 122 is in the initial dwell portion 124 of the cam slot. As the locking pawl 106 initially advances from its limit retracted position, the follower enters the cam portion 125 of the locking member to shift the locking member to its locking position where the locking member remains while the follower reciprocates along the second dwell 126 of the locking member. It is apparent that the locking member 110 functions as means to accurately index the rotary feeder 16.

By virtue of the phase relationships of the eccentric portions 110 and 105 that drive the pusher pawl 102 and locking pawl 106, respectively, and the crank pin 112 that actuates the link 114, the locking member 110 retracts only briefly to permit the pusher pawl 102 to advance the gear 86 by one tooth and then the locking member immobilizes the gear, the gear being immobilized while the feed screw 41 is being rotated by an increment to fill a straw on the rotary feeder 16.

My description of the invention in specific detail will suggest to those skilled in the art various changes, substitutions and other departures from my disclosure.

I claim:

1. Apparatus for placing fluent material in carrier devices, comprising:
    feeding means for supplying carrier devices to an injection station in succession;
    injector means at the injection station for placing a measured quantity of fluent material in said successive carrier devices;
    drive means for alternately operating said feeding means and said injector means to move successive carrier devices to said injection station and to place said quantity of material in each carrier device at the injection station and to move each carrier away from the injection station;
    storage means to receive the material-containing devices that are moved from said injection station; and
    means responsive to the weight of the carrier devices at said storage means to stop said drive means when a predetermined number of the carrier devices are at the storage means.

2. In a device of the character described for placing material in elongated open end containers, the combination of:
    a dispensing syringe to dispense said material at an injection station, said syringe having a dispensing plunger;
    a rotary feeder operable step by step to receive and move said containers to and hold the same in said injection station in sequence;
    power actuated rotary drive means including a shaft;
    a feed screw to advance said plunger incrementally;
    a projection spaced radially from the axis of rotation of the feed screw and operatively connected to the feed screw;
    first means responsive to a first half of a revolution of said drive means shaft to advance said rotary feeder one step to bring an empty container to the injection station;
    second means including spaced shoulders, one of which is the end of an adjustable screw, cooperative alternately with said projection to operate with lost motion to actuate said feed means for incremental advance of the plunger in response to a second half of a shaft; and
    a flexible cable connected to said screw for remote adjustment of the magnitude of incremental advance of the plunger.

3. A combination as set forth in claim 2 in which said projection is operatively connected to the feed screw by a one-way clutch.

4. A combination as set forth in claim 2 in which said rotary feeder has longitudinally extending peripheral recesses to hold said containers.

5. A combination as set forth in claim 2 which includes storage means to receive the material-containing containers from said injection station;
    and which includes means responsive to the weight of the containers at said storage means to stop said rotary drive means when a predetermined number of the containers are at the storage means.

6. A combination as set forth in claim 2 which includes:
    a resilient annular sealing member at the discharge end of said syringe; and
    means responsive to a step of rotation of said rotary feeder to shift a container on the rotary feeder longitudinally into pressure contact with said sealing member to prevent leakage of the material during the incremental advance of said plunger.

7. A combination as set forth in claim 6 in which said shifting means includes circumferentially spaced recesses in the rotary feeder;
    and in which a spring pressed container-shifting member cooperates with the recesses in succession to shift the containers in succession against said sealing member.

8. In a device as set forth in claim 2 wherein
    said first means comprises a gear with radial teeth operatively connected to said rotary feeder;
    pawl means operated by said drive means to engage teeth of said gear periodically to rotate said rotary feeder periodically by one step; and
    locking means operated by said drive means to lock said rotary feed means against rotation in the time intervals between the advances of the pawl means.

9. A combination as set forth in claim 8 in which said locking means is movable into and out of engagement with the teeth of said gear.

10. A combination as set forth in claim 9 in which said locking means is pivoted to swing into and out of engagement with said gear.

11. In a device of the character described for placing material in elongated open end containers, the combination of:
    a dispensing syringe to dispense said material at an injection station, said syringe having a dispensing plunger;
    a rotary feeder operable step by step to move said containers to said injection station in sequence, said rotary feeder having longitudinally extending peripheral recesses to hold said containers;
    a resilient annular sealing member at the discharge end of said syringe; and
    means responsive to a step of rotation of said rotary feeder to shift a container on the rotary feeder longitudinally into pressure contact with said sealing member to prevent leakage of the material during the incremental advance of said plunger.

12. In a device of the character described for placing material in elongated open end containers, the combination of:
    a dispensing syringe to dispense said material at an injection station, said syringe having a dispensing plunger;
    a rotary feeder operable step by step to move said containers to said injection station in sequence, said rotary feeder having longitudinally extending peripheral recesses to hold said containers;
    a resilient annular sealing member at the discharge end of said syringe; and
    means to shift the container on the rotary feeder longitudinally into pressure contact with said sealing member to prevent leakage of the material during the incremental advance of said plunger,
    said shifting means comprising a spring pressed plunger to enter the ends of said longitudinally extending peripheral recesses in succession,
    said rotary feeder having cam surfaces adjacent the respective longitudinally peripheral recesses to retract the spring pressed plunger in response to a step of rotation of the rotary feeder.

UNITED STATES PATENT OFFICE
CERTIFICATE OF CORRECTION

Patent No. 3,593,761　　　　　　　　　Dated　July 20, 1971

Inventor(s)　Curtis L. Lorenz

It is certified that error appears in the above-identified patent and that said Letters Patent are hereby corrected as shown below:

Column 4, line 27, "cause" should read --41--; line 33, "crew" should read --screw--. Column 6, line 2, delete "rounded". Column 7, line 9, "110" should read --100--.

Signed and sealed this 11th day of April 1972.

(SEAL)
Attest:

EDWARD M. FLETCHER, JR.　　　　　　ROBERT GOTTSCHALK
Attesting Officer　　　　　　　　　　Commissioner of Patents